(12) United States Patent
Roy et al.

(10) Patent No.: US 11,428,515 B2
(45) Date of Patent: Aug. 30, 2022

(54) FIN BLOCKING DEVICE AND PROJECTILE HAVING SUCH A DEVICE

(71) Applicant: NEXTER MUNITIONS, Versailles (FR)

(72) Inventors: Richard Roy, Bourges (FR); Sylvain Pinoteau, Bourges (FR)

(73) Assignee: NEXTER MUNITIONS, Versailles (FR)

( * ) Notice: Subject to any disclaimer, the term of this patent is extended or adjusted under 35 U.S.C. 154(b) by 111 days.

(21) Appl. No.: 16/753,506

(22) PCT Filed: Sep. 28, 2018

(86) PCT No.: PCT/EP2018/076537
§ 371 (c)(1),
(2) Date: Apr. 3, 2020

(87) PCT Pub. No.: WO2019/068591
PCT Pub. Date: Apr. 11, 2019

(65) Prior Publication Data
US 2020/0256655 A1    Aug. 13, 2020

(30) Foreign Application Priority Data

Oct. 4, 2017    (FR) ...................................... 1701026

(51) Int. Cl.
*F42B 10/14*    (2006.01)
*F42B 10/64*    (2006.01)
*F16D 43/202*    (2006.01)

(52) U.S. Cl.
CPC .............. *F42B 10/14* (2013.01); *F42B 10/64* (2013.01); *F16D 43/202* (2013.01)

(58) Field of Classification Search
CPC .......... F42B 10/64; F42B 10/26; F42B 10/16; F42B 10/06; F42B 10/62; F42B 10/04; F16D 43/202
See application file for complete search history.

(56) References Cited

U.S. PATENT DOCUMENTS 2,784,669 A * 3/1957 Apotheloz .............. F42B 10/16
244/3.29
2,793,591 A * 5/1957 Jasse ....................... F42B 10/16
244/3.29

(Continued)

FOREIGN PATENT DOCUMENTS

FR    2 895 071 A1    6/2007
FR    3 037 390 A1    12/2016

OTHER PUBLICATIONS

May 23, 2018 Search Report and Written Opinion issued in French Patent Application No. 1701026.

(Continued)

*Primary Examiner* — Assres H Woldemaryam
(74) *Attorney, Agent, or Firm* — Oliff PLC (57) ABSTRACT

A device for blocking a fin of a projectile, the fin including a fin base pivoting about a pivot pin secured to the body of the projectile between a withdrawn fin position and a deployed fin position, wherein the device includes at least one recess housing at least one shape of revolution pushed by a resilient means between a first surface borne by the fin and a second surface borne by the body of the projectile, at least one of the two surfaces forming a ramp that converges toward the other surface to tend to cause jamming of the shape of revolution between the two surfaces.

9 Claims, 6 Drawing Sheets

(56) References Cited

U.S. PATENT DOCUMENTS

| | | | | |
|---|---|---|---|---|
| 4,143,838 | A * | 3/1979 | Holladay | F42B 10/14 244/3.28 |
| 4,165,847 | A * | 8/1979 | Detalle | F42B 10/16 244/3.29 |
| 4,175,720 | A * | 11/1979 | Craig | F42B 10/14 244/3.28 |
| 5,114,095 | A * | 5/1992 | Schroppel | F42B 10/20 244/3.28 |
| 5,211,357 | A * | 5/1993 | Leidenberger | F42B 10/14 244/3.28 |
| 5,685,503 | A * | 11/1997 | Trouillot | F42B 10/14 244/3.28 |
| 7,919,739 | B2 | 4/2011 | Trouillot | |
| 8,569,670 | B1 * | 10/2013 | Carlucci | F42B 10/20 244/3.28 |
| 9,989,338 | B2 * | 6/2018 | Osdon | F42B 10/16 |
| 2003/0071166 | A1 * | 4/2003 | Moore | F42B 10/38 244/3.28 |
| 2004/0217227 | A1 * | 11/2004 | Alculumbre | F42C 1/04 244/3.28 |
| 2016/0223305 | A1 * | 8/2016 | Alculumbre | F42B 10/16 |

OTHER PUBLICATIONS

Dec. 19, 2018 Search Report and Written Opinion issued in International Patent Application No. PCT/EP2018/076537.

* cited by examiner

FIN BLOCKING DEVICE AND PROJECTILE HAVING SUCH A DEVICE

The technical field of the invention is that of projectile fin blocking devices and projectiles including fins able to be blocked by such devices.

In order to stabilize a projectile on its path and increase its range, it is known to attach fins to it that are evenly distributed over its perimeter.

So as not to interfere with launching means of the projectile, the fins are, upon the departure of the projectile, in a withdrawn position. The fins are next deployed, that is to say, placed in a position where they extend radially with respect to the longitudinal axis of the projectile.

In order to prevent the fin from folding after a rebound during its deployment, known from patent FR 2,895,071 is a blocking device preventing the folding of a fin owing to a blade in contact with a base of the fin. The blade bends when the fin deploys and braces itself to block the fin if the latter tries to fold.

Such a device does not prove suitable to all deployment configurations of fins, in particular when the fin has a pivot pin of its fin base that is parallel to the longitudinal axis of the projectile, but above all, the bracing is not always perfectly and quickly obtained, which sometimes causes partial retraction of the fin.

Also known from patent U.S. Pat. No. 4,143,838 is a device for blocking a fin of a projectile including a ball contained in a fin cavity when the fin is retracted. When the fin is deployed, the ball is pushed partially into a groove of the projectile.

However, the radial pushing of the ball provided by a spring does not make it possible to guarantee rigid locking of the fin in the deployed position. Indeed, the functional plays necessary for this device lead to a possibility of oscillation of the fin in the deployed position, which is a source of instability of the deployed position and can lead to a rebound of the fin.

Also known from patent FR 3,037,390 is a device for blocking a fin of a projectile including a weight able to keep the fin retracted during the longitudinal acceleration of the projectile and able to slide below a base of the fin during the flight of the projectile. This device is complex and requires the presence of an inertial weight, separated during firing, and able to return to ensure the blocking. It will also be noted that failure of the weight to return leads to the absence of blocking of the fins.

The invention proposes to address this issue of reliability and solidity of the blocking. Additionally, the invention makes it possible to ensure the blocking of fins pivoting either about an axis parallel to the projectile, or about an axis perpendicular to the projectile.

Thus, the invention relates to a device for blocking a fin of a projectile, the fin including a fin base pivoting about a pivot pin secured to the body of the projectile between a withdrawn fin position and a deployed fin position, the device being characterized in that it includes at least one recess housing at least one shape of revolution pushed by a resilient means between a first surface borne by the fin and a second surface borne by the body of the projectile, at least one of the two surfaces forming a ramp that converges toward the other surface to tend to cause jamming of the shape of revolution between the two surfaces, the resilient means ensuring constant contact of the shape of revolution with the ramp and the other surface.

Advantageously, the pivot pin of the fin base is parallel to the longitudinal axis of the projectile, the fin base including an at least partially circular profile located in a housing of the body with shape matching with the fin base so as to allow the pivoting of an outer surface of the fin base relative to an inner surface of the housing.

Advantageously, the shape of revolution includes a roller and the resilient means includes an undulating leaf spring placed along the roller.

Advantageously, the pivot pin of the fin base is perpendicular to the longitudinal axis of the projectile.

Advantageously, the shape of revolution includes a ball and the resilient means includes a leaf spring bearing on the ball.

Advantageously, the recess is formed in the fin base and includes the first surface, which forms a ramp.

Advantageously, the recess is formed in the projectile body and includes the second surface, which forms a ramp.

Advantageously, the device includes a plurality of recesses.

The invention also relates to a projectile including several fins evenly distributed around the projectile, the projectile being characterized in that it includes, at each fin, at least one device according to the invention.

The invention will be better understood upon reading the following description, which is done in reference to the appended drawings, in which.

Figure 1A:
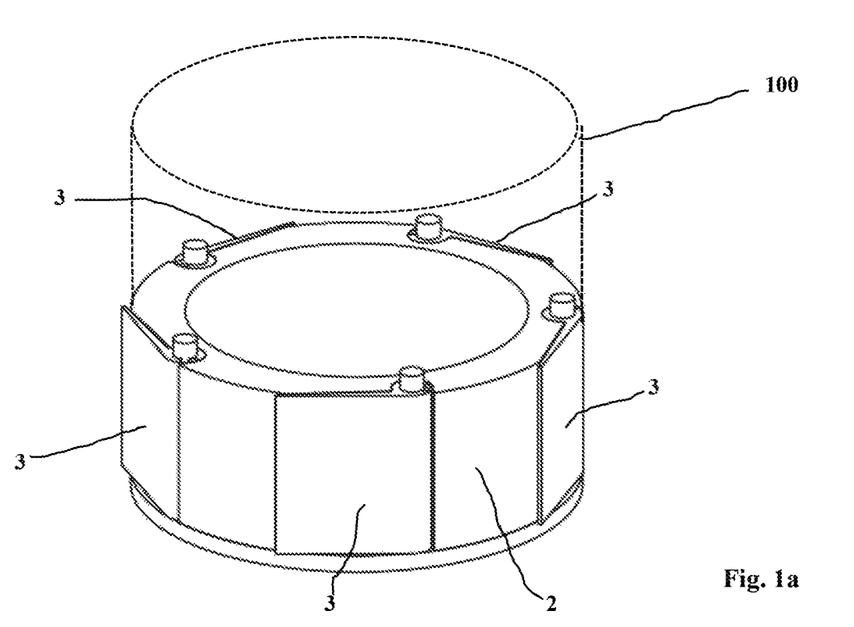
FIG. 1*a* shows a partial three-quarters view of a projectile including a device according to the invention with fins in the withdrawn position.

According to FIG. 1*a*, the back of a projectile 100 (projectile 100 symbolized by dotted lines) includes a substantially annular body 2 that includes fins 3 evenly distributed all the way around the body 2, in a so-called withdrawn position where each fin 3 is folded on the body 2. In this position, the fins are not exposed and make it possible to fire the projectile without risk of interference with an element outside the projectile.

Figure 1B:
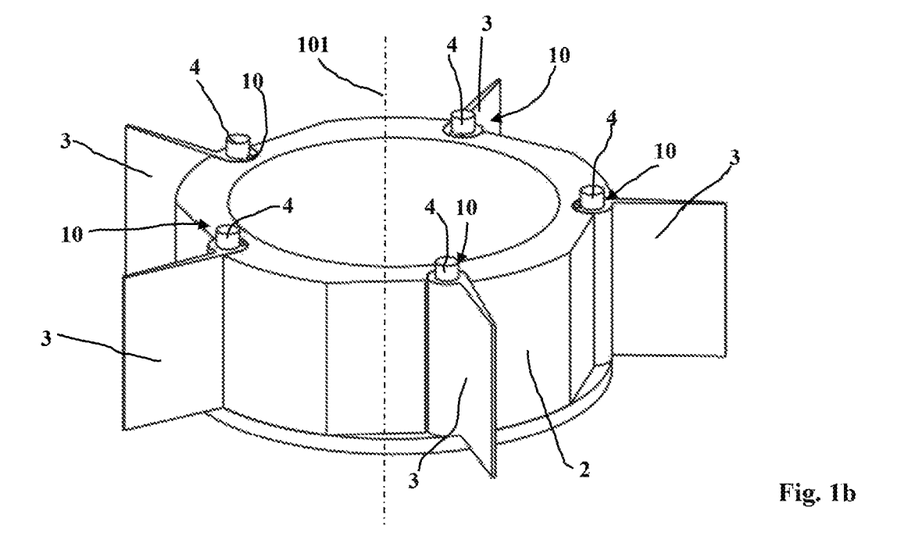
FIG. 1*b* shows a partial three-quarters view of a projectile including a device according to the invention with fins in the deployed position.

According to FIG. 1*b*, the fins 3 are pivoted into a so-called deployed position where the fins 3 extend radially relative to the longitudinal axis 101 of the projectile 100. It will be noted that each fin 3 is pivoting about a pivot pin 4 secured to the body 1, the pivot pin 4 being parallel to the longitudinal axis 101 of the projectile 100. In the deployed position, the fins 3 exert their full lift, optimizing the range and the stability of the projectile 100. The projectile 100 includes, at each fin 3, a blocking device 10 leaving each fin 3 free to pivot from the withdrawn position to the deployed position and preventing each fin from folding back toward the withdrawn position, as we will see later. The means ensuring the pivoting of each fin 3 are not the subject matter of the invention and are therefore not described. These means can comprise: motor means, springs or indeed an implementation of the centrifugal force exerted on each fin 3 by the rotation of the projectile 100 or by aerodynamic effects at each fin 3.

Figure 2:
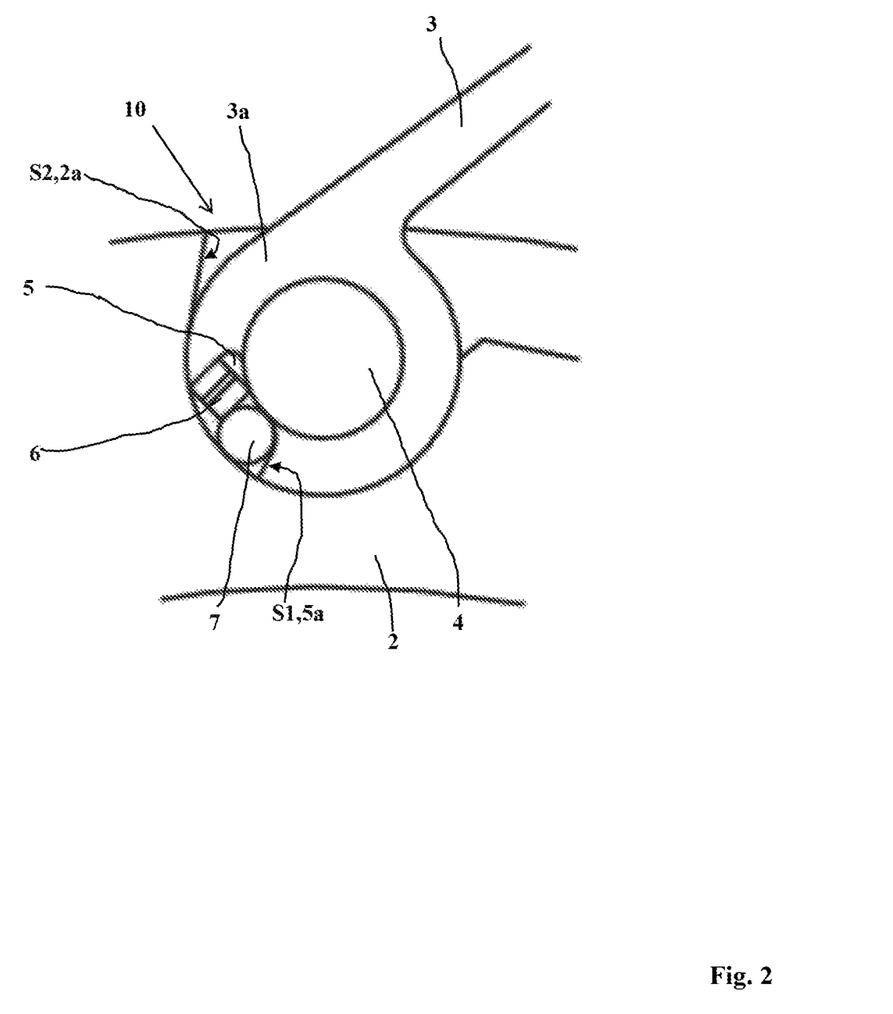
FIG. 2 shows a partial cross-sectional view of a device according to a first embodiment of the invention in an intermediate position.

According to FIG. 2, the fin 3 includes a fin base 3a with a partially circular profile placed in a housing 2a of the body 2, the housing 2a having shape matching with the fin base 3a so as to allow the pivoting of an outer surface of the fin base 3a relative to an inner surface of the housing 2a during the deployment of the fin 3.

According to the illustrated embodiment, the fin base 3a includes a recess 5 that extends longitudinally parallel to the pivot pin 4 of the fin 3, and therefore parallel to the axis of the projectile (axis of the projectile visible in FIG. 1b). The housing 5 is occupied by a resilient means 6 that pushes a shape of revolution 7. In the case at hand, the resilient means 6 includes an undulating spring leaf 6 and the shape of revolution includes a cylindrical roller 7. The roller 7 is pushed by the spring leaf 6 toward a first surface S1 of the fin that is carried by the recess 5 and that forms a ramp 5a converging toward a second surface S2, which here is the inner surface of the housing 2a. It will be recalled that the spring 6 ensures permanent contact of the shape of revolution (roller) 7 with the ramp 5a (first surface S1) and the inner surface S2 of the housing 2a (second surface S2).

During a deployment of the fin 3, the fin base 3a pushes the spring 6, which in turn pushes the roller 7, which then rotates around itself in the recess 5 or slides over the surface S2 of the housing 2a. The fin is free to pivot toward the deployed position.

Figure 3:
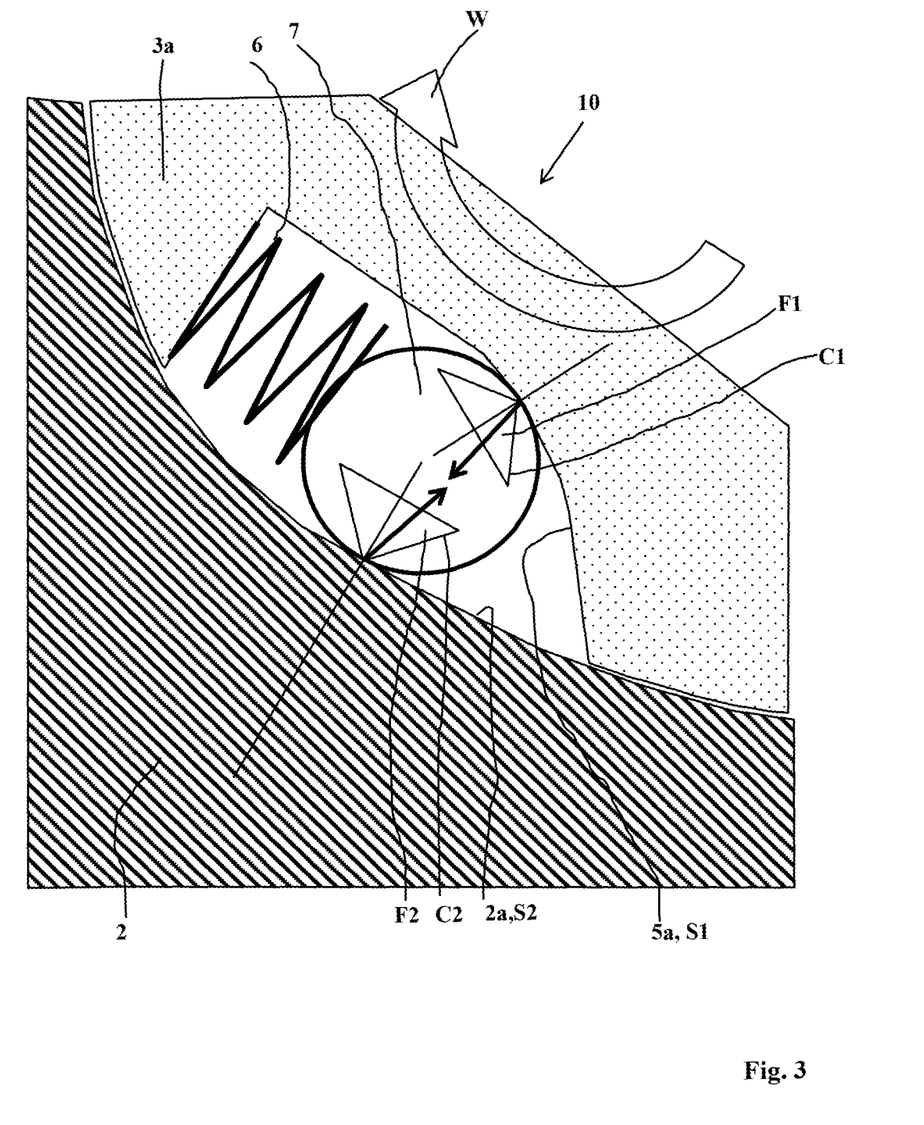
FIG. 3 shows a schematic detail view of a device according to the invention blocking a fin.

Conversely, as described in detail in FIG. 3, the application of a torque W tending to pivot the fin 3 toward the closed or folded position applies a force F1 from the ramp 5a on the roller 7, the force F1 being balanced by a force F2 applied to the roller 7 by the inner surface S2 of the housing 2a, resulting in a jamming of the roller (shape of revolution 7) between the ramp 5a (first surface S1) and the inner surface S2 of the housing 2a, which blocks the pivoting of the fin 3 in the direction of the withdrawn position.

In order to obtain the blocking without sliding, One Skilled in the Art will take care to choose materials for the roller 7, the ramp 5a and the housing 2a and angles between the normals at the points of application of the forces F1 and F2 such that these two forces F1 and F2 are applied in the respective friction cones c1 and c2 of these two forces.

Figure 4:
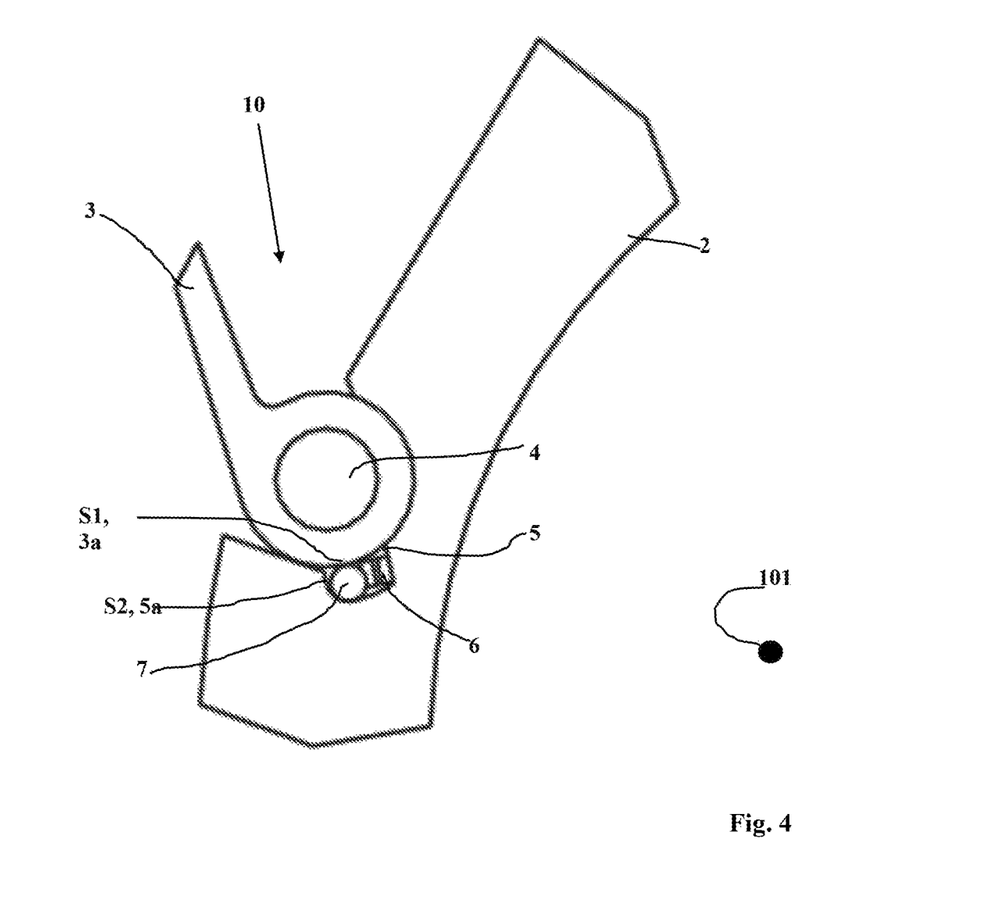
FIG. 4 shows a detail view of a device according to a second embodiment of the invention in an intermediate position.

According to FIG. 4, a recess 5 containing the roller 7 (or shape of revolution) and the spring 6 is formed in the housing 2a. In this case, the first surface S1 is made up of the cylindrical surface 3a of the base of the fin 3 and the second surface S2 is borne by the projectile body 2 and is made up of the ramp 5a of the recess 5. The jamming will be done in this case between the ramp 5a and the surface 3a of the fin base, which pivots relative to the ramp.

Figure 5A:
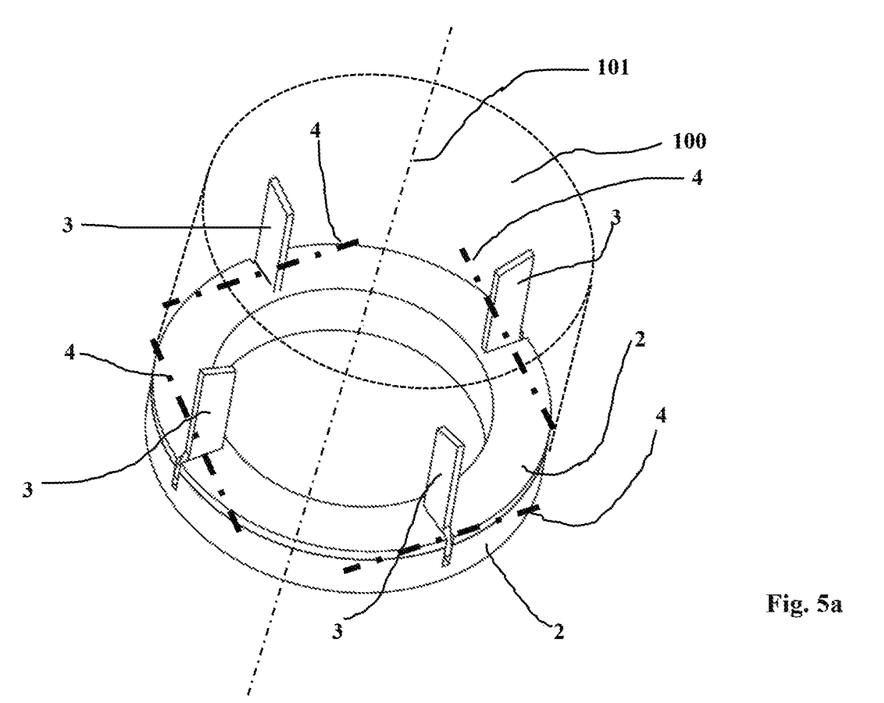
FIG. 5*a* shows a partial three-quarters view of a projectile including a device according to a third embodiment of the invention with fins in the withdrawn position.
Figure 5B:
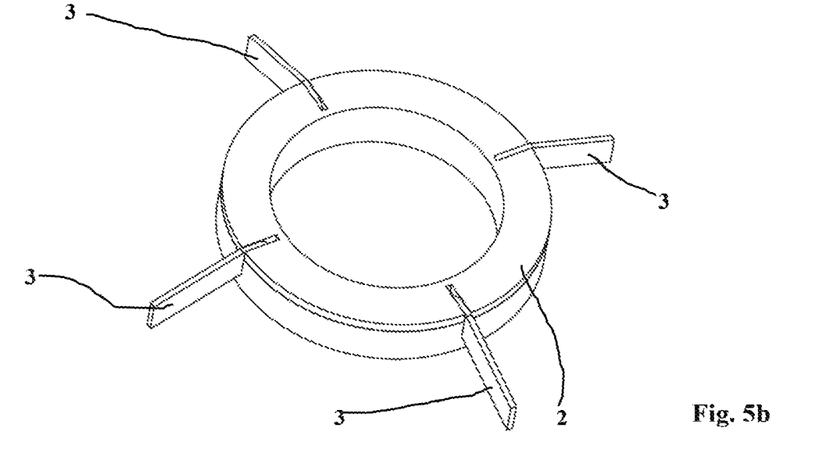
FIG. 5*b* shows a partial three-quarters view of a projectile including a device according to a third embodiment of the invention with fins in the deployed position.

According to FIG. 5a, the projectile 100 shown in dotted lines includes fins 3, the deployment of which is done around pivot axes 4 that are perpendicular to the longitudinal axis 101 of the projectile 100 such that when the fins are in the withdrawn position, they are located inside the projectile 100 like in FIG. 5a and extend radially like in FIG. 5b when they are in the deployed position.

Figure 6:
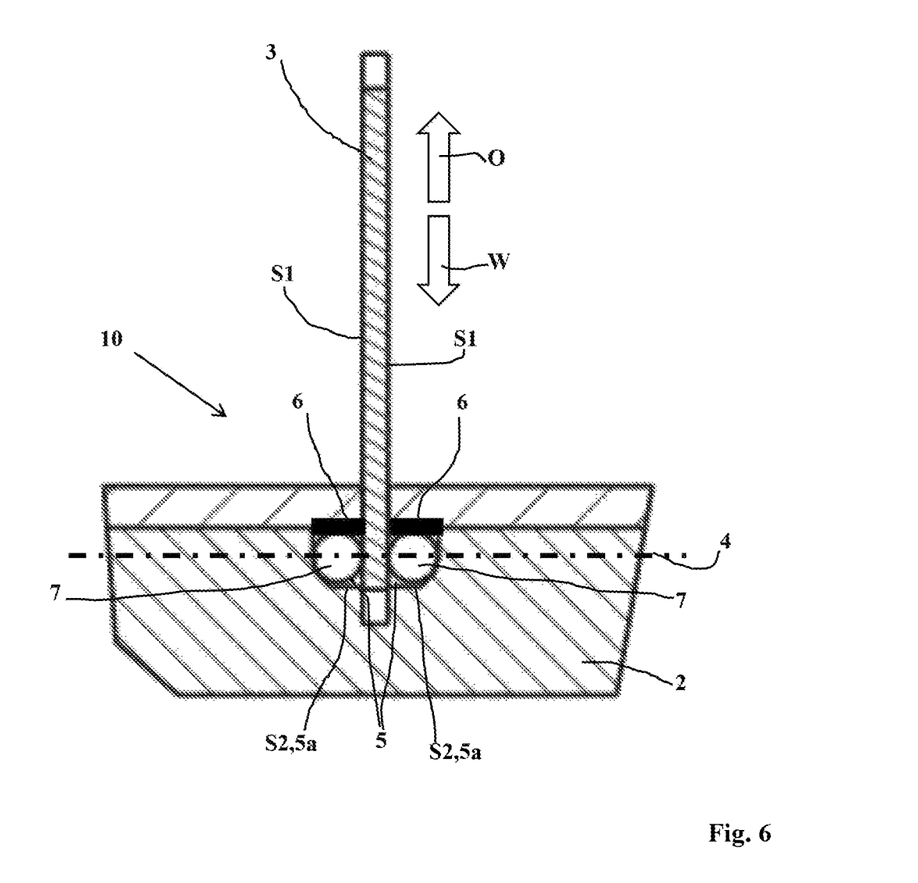
FIG. 6 shows a cross-sectional detailed view of a device according to a third embodiment of the invention in the deployed position.

According to FIG. 6, the projectile 100 includes, for each fin 3 and at each face of the fin base 3, a blocking device 10 including a recess 5 containing a shape of revolution 7, in the case at hand the ball 7, pushed by a spring 6 toward a ramp 5a converging toward the lateral surface of the fin base 3. In this case, the first surface S1 is formed by the lateral face of the fin 3 and the second surface S2 is borne by the recess 5 arranged in the body 2. The resilient means 6 here again ensures constant contact of the ball 7 with the ramp 5a on the one hand and with the first surface S1 borne by the fin on the other hand. According to this embodiment, there are two blocking devices, one on each side of the fin 3.

When a torque O tends to pivot the fin 3 toward the open position, the ball 7 is driven by friction against the face of the fin base 3 and compresses the spring 6, which allows a free opening of the fin 3. Conversely, when a torque W tends to pivot the fin 3 toward its closed position, the ball 7 is pressed toward the ramp 5a by the spring 6, is also driven by friction against the fin base 3 toward the ramp 5a, which results in the jamming of the fin under the equilibrium conditions of the forces explained in the previous embodiment.

Thus, the invention makes it possible to address this issue of reliability and consistency of the blocking and also makes it possible to ensure the blocking of fins pivoting either about an axis parallel to the projectile, or about an axis perpendicular to the projectile.

The invention claimed is:

1. A projectile comprising:
a body;
a plurality of fins including a first fin, the first fin including
a fin base pivoting about a pivot pin secured to the body between a withdrawn fin position and a deployed fin position; and
a first projectile fin blocking device for blocking the first fin, the first projectile fin blocking device comprising:
at least one recess housing at least one shape of revolution pushed by a resilient means between a first surface borne by the first fin and a second surface borne by the body of the projectile, wherein
at least one of the first and the second surfaces forming a ramp that converges toward the other of the first and the second surfaces to tend to cause jamming of the shape of revolution between the first and the second surfaces, and
the resilient means (i) ensuring constant contact of the shape of revolution with one of the first and the second surfaces including the ramp and the other of the first and the second surfaces, and (ii) being configured to push the shape of revolution against both the first and the second surfaces.

2. The projectile according to claim 1, wherein the pivot pin of the fin base is parallel to a longitudinal axis of the projectile, the fin base including an at least partially circular profile located in a housing of the body with a shape matching with the fin base so as to allow the pivoting of an outer surface of the fin base relative to an inner surface of the housing.

3. The projectile according to claim 2, wherein the shape of revolution includes a roller and the resilient means includes an undulating leaf spring placed along the roller.

4. The projectile according to claim 1, wherein the pivot pin of the fin base is perpendicular to a longitudinal axis of the projectile.

5. The projectile according to claim 4, wherein the shape of revolution includes a ball and the resilient means includes a leaf spring bearing on the ball.

6. The projectile according to claim 1, wherein the recess is formed in the fin base and includes the first surface, which forms the ramp.

7. The projectile according to claim 1, wherein the recess is formed in the body of the projectile and includes the second surface, which forms the ramp.

8. The projectile according to claim 1, further comprising: a plurality of recesses including the recess.

9. The projectile according to claim 1, wherein:
the plurality of fins are evenly distributed around the projectile, and
the projectile includes, at each fin, at least one of a plurality of projectile fin blocking devices, the plurality of projectile fin blocking devices including the first projectile fin blocking device.

* * * * *